US 9,455,651 B2

(12) United States Patent
Adra et al.

(10) Patent No.: US 9,455,651 B2
(45) Date of Patent: Sep. 27, 2016

(54) MOTOR DRIVER HAVING INTEGRATED BRAKING CHOPPER

(71) Applicant: Caterpillar Inc., Peoria, IL (US)

(72) Inventors: Rodwan T. Adra, Peoria, IL (US);
Edward L. Zwilling, Washington, IL (US); Thomas M. Baker, Peoria, IL (US); William J. Tate, Dunlap, IL (US); Eric M. Andris, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 14 days.

(21) Appl. No.: 14/572,355

(22) Filed: Dec. 16, 2014

(65) Prior Publication Data
US 2016/0173011 A1    Jun. 16, 2016

(51) Int. Cl.
*H02P 3/12* (2006.01)
*H02P 3/22* (2006.01)
*H02P 27/06* (2006.01)

(52) U.S. Cl.
CPC ............. *H02P 3/22* (2013.01); *H02P 27/06* (2013.01)

(58) Field of Classification Search
CPC ........................................................ H02P 3/12
USPC ................................. 318/380, 379, 375, 362
See application file for complete search history.

(56) References Cited

U.S. PATENT DOCUMENTS

| 7,202,625 | B2 | 4/2007 | Adra et al. | |
| 7,330,012 | B2* | 2/2008 | Ahmad | B60L 1/003 |
| | | | | 180/165 |
| 7,372,712 | B2 | 5/2008 | Stancu et al. | |
| 7,385,372 | B2* | 6/2008 | Ahmad | B60L 1/003 |
| | | | | 180/165 |
| 7,430,132 | B2 | 9/2008 | Morishita | |
| 7,643,319 | B2 | 1/2010 | Wagoner | |
| 7,859,212 | B2 | 12/2010 | Pan et al. | |
| 7,994,750 | B2 | 8/2011 | Wagoner et al. | |
| 8,107,267 | B2* | 1/2012 | Tallam | H02M 1/44 |
| | | | | 363/127 |
| 8,810,179 | B2 | 8/2014 | De Wergifosse | |

FOREIGN PATENT DOCUMENTS

| CN | 103532449 A | 1/2014 |
| EP | 2 582 032 A2 | 4/2013 |
| JP | S58-127575 | 7/1983 |
| JP | 2004-320964 A | 11/2004 |

* cited by examiner

*Primary Examiner* — David S Luo
(74) *Attorney, Agent, or Firm* — Finnegan, Henderson, Farabow, Garrett & Dunner, LLP

(57) ABSTRACT

A motor driver for driving a motor is disclosed. The motor driver has a first power bus, a first switching device coupled between the first power bus and a first terminal of the motor, a second power bus, a second switching device coupled between the second power bus and a second terminal of the motor, and an integrated braking chopper coupled between the first and second power buses. The integrated braking chopper is configured to dissipate an extra power generated by the motor.

21 Claims, 3 Drawing Sheets

MOTOR DRIVER HAVING INTEGRATED BRAKING CHOPPER

TECHNICAL FIELD

The present disclosure is related generally to a motor driver and, more particularly, to a motor driver having an integrated braking chopper.

BACKGROUND

A motor, such as a switched reluctance (SR) motor, is used to generate a mechanical power in response to an electrical input from a power source. Often times, the motor needs to be coupled to a power grid, such as a three-phase power grid, that provides electrical power to a large area. A motor system usually includes a motor driver that couples the motor to the power grid. The motor driver receives an input from the power grid and converts it to an electrical output that can be applied to the motor.

Some applications require that the motor operate at a variable speed. In such scenarios, the motor driver may need to be able to handle a peak voltage from the power grid. Power grids in different areas may have different voltage levels, and some power grids may have a grid voltage (effective voltage) higher than 500 V. For example, the grid voltage of a power grid may be as high as about 1000 V. The peak voltage of such a power grid is about 1400 V. Therefore, for a motor system coupled to such a power grid, the motor driver needs to be able to handle a voltage of about 1400 V.

One approach to achieve this purpose is to use higher voltage rated semiconductor devices, motor insulation systems, and other electric components that can function under the high voltage. However, such components usually cost more and have larger physical sizes. As a result, the motor also requires a more expensive insulation system, and has a higher construction cost and larger physical size.

U.S. Pat. No. 7,859,212 (the '212 patent) that issued to Pan et al. on Dec. 28, 2010, discloses a motor drive system with redundancy to compensate for possible failure in one or more of the inverters. When one of the inverters fails, either the other inverters increase output power to compensate for the power reduction due to such failure or a spare inverter is connected into the system.

However, in the system of the '212 patent, each inverter still operates under the full voltage of the power source. Therefore, the components in the system still need to be able to sustain the high voltage if the power source supplies a high voltage as described above.

The disclosed system is directed to overcoming one or more of the problems set forth above.

SUMMARY OF THE INVENTION

In one aspect, the present disclosure is directed to a motor driver that includes a first power bus, a first switching device coupled between the first power bus and a first terminal of a motor, a second power bus, a second switching device coupled between the second power bus and a second terminal of the motor, and an integrated braking chopper coupled between the first and second power buses. The integrated braking chopper is configured to dissipate an extra power generated by the motor.

In another aspect, the present disclosure is directed to a motor driver that includes a first power converter, a second power converter, and a rectifier coupled to the first and second power converters. The first power converter is configured to provide a first electric power to a motor. The second power converter is configured to provide a second electric power to the motor. The rectifier is configured to generate a DC voltage from an AC input, divide the DC voltage into at least a first DC output and a second DC output, and apply the first DC output to the first power converter and the second DC output to the second power converter.

In yet another aspect, the present disclosure is directed to a motor system that includes a motor and a motor driver configured to drive the motor. The motor driver includes a first power converter, a second power converter, and a rectifier coupled to the first and second power converters. The first power converter includes a first power bus, a first switching device coupled between the first power bus and the motor, a second power bus, a second switching device coupled between the second power bus and the motor, and a first integrated braking chopper coupled between the first and second power buses. The first integrated braking chopper is configured to dissipate an extra power generated by the motor. The second power converter includes a third power bus, a third switching device coupled between the third power bus and the motor, a fourth power bus, a fourth switching device coupled between the fourth power bus and the motor, and a second integrated braking chopper coupled between the third and fourth power buses. The second integrated braking chopper is configured to dissipate the extra power generated by the motor. The rectifier is configured to generate a first DC output and a second DC output from an AC input, and apply the first DC output to the first power converter and the second DC output to the second power converter.

DETAILED DESCRIPTION

Figure 1:
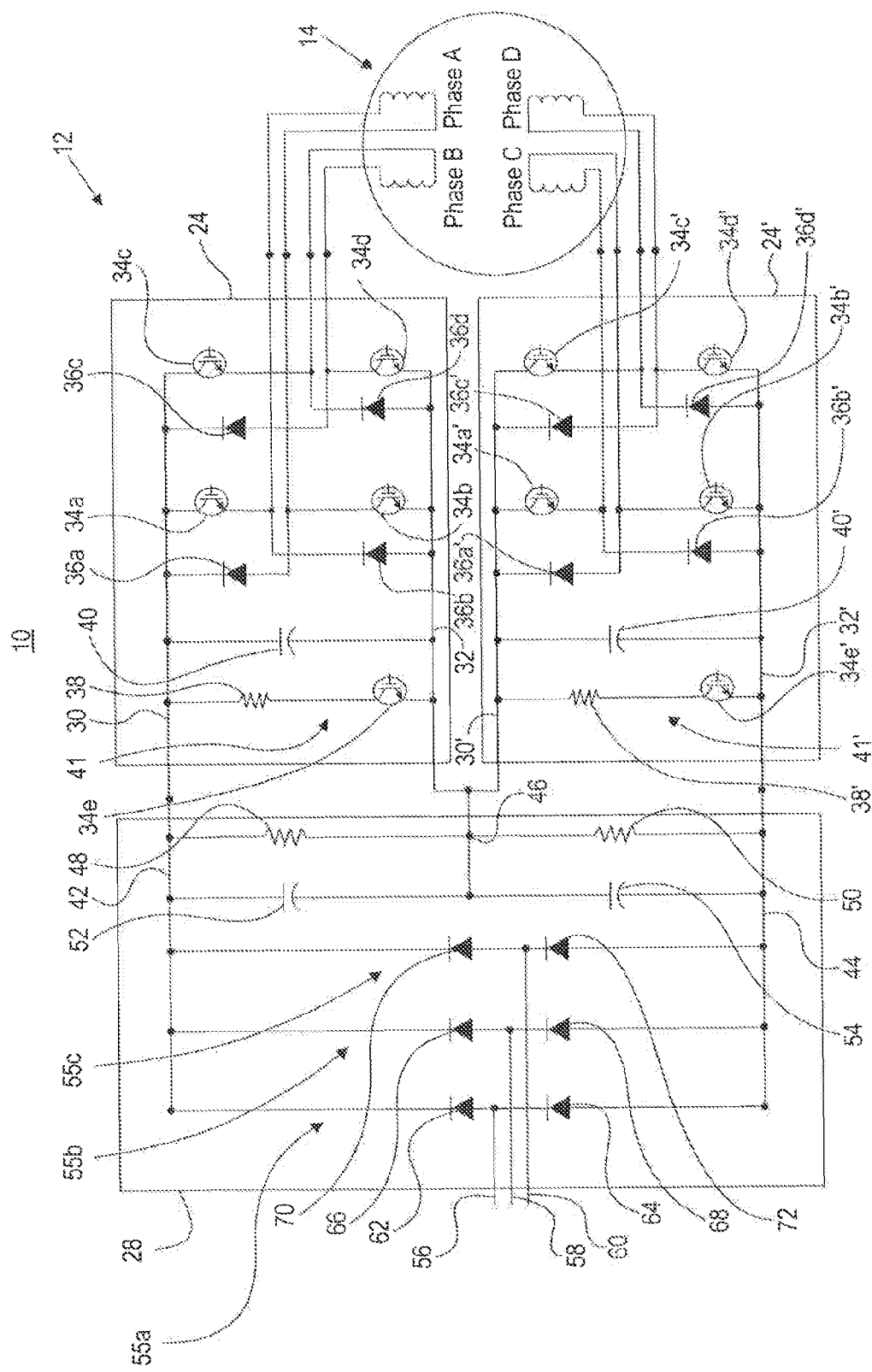
FIG. 1 is a circuit diagram illustrating an exemplary motor system.

FIG. 1 illustrates an exemplary motor system 10 having a motor driver 12 and a motor 14. Motor system 10 may form a portion of a fixed or mobile machine that performs some type of operation associated with an industry such as mining, construction, farming, transportation, or any other industry known in the art. For example, motor system 10 may form a portion of an earth moving machine such as an excavator, a dozer, a loader, a backhoe, a motor grader, a dump truck, or any other earth moving machine. In motor system 10, motor driver 12 is configured to provide an electric power to motor 14.

Figure 2:
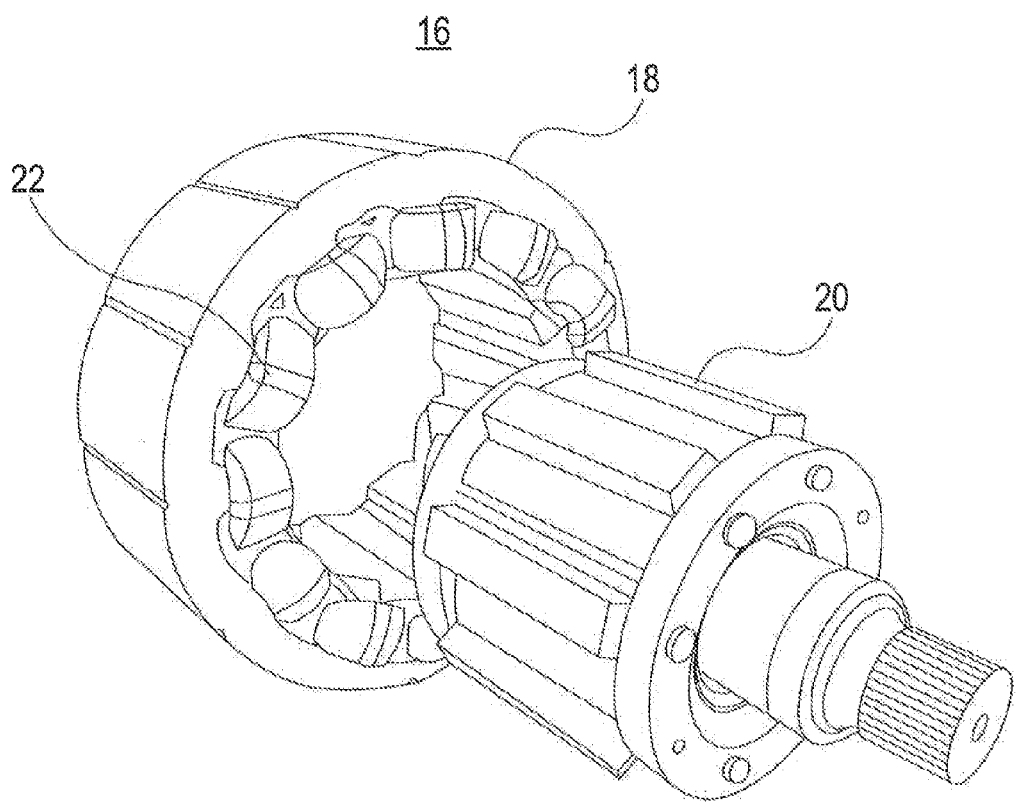
FIG. 2 is a perspective view illustrating an exemplary motor for the motor system of FIG. 1.

Consistent with embodiments of the disclosure, motor 14 may be a switched reluctance ("SR") motor, but can also embody another type of motor, provided the other type of motor has independently operated and electrically isolated phases. As one of ordinary skill in the art would understand, an SR motor has a plurality of magnetic poles mounted on a stator, which are grouped into two or more phases. Each phase may include one or more pairs of magnetic poles. In the situation where a phase includes more than one pairs of magnetic poles, the magnetic poles in the same phase may be coupled to each other in a parallel connection. The magnetic poles in different phases are electrically isolated from each other. The two or more phases of the SR motor are electrically energized in sequence to generate a rotating magnetic field, forcing a rotor to rotate. FIG. 2 is a perspective view of an exemplary SR motor 16, which includes a stator 18 and a rotor 20. Stator 18 has a plurality of magnetic poles 22, each of which includes a concentrated coil wound on a bobbin or in a coil form, and inserted on a steel tooth of the stator 18. In the example shown in FIG. 2, motor 16 has three phases and twelve magnetic poles 22, i.e., four magnetic poles 22 per phase. Consistent with embodiments of the disclosure, a motor may have different number of magnetic poles and/or phases. For example, motor 14 shown in FIG. 1 has at least four phases: Phase A, Phase B, Phase C, and Phase D.

Referring again to FIG. 1, motor driver 12 includes a first power converter 24, a second power converter 24', and a rectifier 28. First power converter 24 is coupled to and configured to provide electric power to Phase A and Phase B of motor 14. Second power converter 24' is coupled to and configured to provide electric power to Phase C and Phase D of motor 14. Rectifier 28 is coupled to both first and second power converters 24 and 24'. Further, rectifier 28 is configured to rectify an AC input to generate a first DC output and a second DC output to be supplied to first and second power converters 24 and 24', respectively.

First power converter 24 includes a positive power bus 30 and a negative power bus 32 for receiving the first DC output from rectifier 28, and providing electric power to other components of first power converter 24, which are coupled directly or indirectly between positive and negative power buses 30 and 32. Specifically, other components of first power converter 24 may include insulated-gate bipolar transistors (IGBTs) 34a, 34b, 34c, 34d, and 34e, diodes 36a, 36b, 36c, and 36d, a resistor 38, and a capacitor 40. In this disclosure, since first power converter 24 operates under the DC output generated by rectifier 28, a power bus of first power converter 24 may also be referred to as a DC bus.

Consistent with embodiments of the disclosure, each of IGBTs 34a, 34b, 34c, and 34d constitutes a switching device coupled between one of positive and negative power buses 30 and 32 and one end of one of Phase A and Phase B of motor 14. In the disclosure, IGBTs 34a, 34b, 34c, and 34d (and IGBTs 34a', 34b', 34c', and 34d' described below) may also be referred to as motor phase control IGBTs. According to the disclosure, an end of a phase of motor 14 may constitute a terminal of motor 14. The switching devices can be turned on and off, so as to control a power applied to different phases of motor 14. Specifically, IGBT 34a is coupled between positive power bus 30 and one end of Phase A of motor 14; IGBT 34b is coupled between another end of Phase A of motor 14 and negative power bus 32; IGBT 34c is coupled between positive power bus 30 and one end of Phase B of motor 14; and IGBT 34d is coupled between another end of Phase B of motor 14 and negative power bus 32. IGBT 34a, 34b, 34c, and 34d may be substantially identical to each other, or different from each other.

Each of IGBTs 34a, 34b, 34c, and 34d has a collector, an emitter, and a gate. As shown in FIG. 1, the collectors of IGBT 34a and 34c are coupled to positive power bus 30, and the emitter of each of IGBT 34a and 34c is coupled to one end of one of Phase A and Phase B of motor 14. On the other hand, the collector of each of IGBTs 34b and 34d is coupled to another end of one of Phase A and Phase B of motor 14, and the emitters of IGBT 34b and 34d are coupled to negative power bus 32.

The gate of each of IGBTs 34a, 34b, 34c, and 34d is configured to receive a controlling signal, which controls on and off of the corresponding IGBT. The controlling signals applied to the gates of IGBTs 34a, 34b, 34c, and 34d may be identical to or different from each other. By properly applying the controlling signals, i.e., controlling the timing and/or duration for turning on and off IGBTs 34a, 34b, 34c, and 34d, a particular power scheme may be applied to Phase A and Phase B of motor 14, so as to generate a required magnetic field in motor 14.

In the example shown in FIG. 1, IGBTs 34a, 34b, 34c, and 34d are employed as the switching devices. In some embodiments, other devices may also be used as the switching devices, as long as they can be turned on and off by a controlling signal. For example, the switching devices may be regular bipolar junction transistors (BJTs) or field-effect transistors (FET's) such as metal-on-semiconductor FETs (MOSFETs).

As shown in FIG. 1, each of diodes 36a, 36b, 36c, and 36d has an anode and a cathode, and is coupled between one of positive and negative power buses 30 and 32 and the emitter or the collector of one of IGBTs 34a, 34b, 34c, and 34d. Specifically, the cathodes of diodes 36a and 36c are coupled to positive power bus 30, and the anodes of diodes 36a and 36c are coupled to the collectors of IGBTs 34b and 34d, respectively. On the other hand, the anodes of diodes 36b and 36d are coupled to negative power bus 32, and the cathodes of diodes 36b and 36d are coupled to the emitters of IGBTs 34a and 34c, respectively. Diodes 36a, 36b, 36c, and 36d are provided for feedback of a back electromotive force created at the time of turning off the switching devices.

Referring to FIG. 1, capacitor 40 is coupled between positive and negative power buses 30 and 32, and is provided to assist in smoothing the voltage applied across positive and negative power buses 30 and 32, that is, to limit fluctuations in the voltage applied across positive and negative power buses 30 and 32, so as to suppress electrical switching transients and therefore protect the IGBTs 36a, 36b, 36c, and 36d from overvoltage during operation.

As shown in FIG. 1, IGBT 34e and resistor 38 are coupled to each other in a series connection, and constitute an integrated braking chopper 41 configured to dissipate an extra power generated by motor 14 during, e.g., motor braking. In this disclosure, IGBT 34e (and IGBT 34e') may also be referred to as braking chopper IGBT. In some embodiments, integrated braking chopper 41 may include other components, so long as it is capable of dissipating the extra power generated by motor 14.

Integrated braking chopper 41 consisting of IGBT 34e and resistor 38 is coupled between positive and negative power buses 30 and 32. In some embodiments, as shown in FIG. 1, one end of resistor 38 is coupled to positive power bus 30, another end of resistor 38 is coupled to a collector of IGBT 34e, and an emitter of IGBT 34e is coupled to negative power bus 32. In some embodiments, the collector of IGBT 34e may be coupled to positive power bus 30, while resistor 38 is coupled between the emitter of IGBT 34e and negative power bus 32. IGBT 34e further includes a gate configured to receive a controlling signal, which controls on and off of IGBT 34e.

Referring to FIG. 1, second power converter 24' includes a positive power bus 30' and a negative power bus 32' for receiving the second DC output from rectifier 28 (thus a power bus of second power converter 24' may also be referred to as a DC bus), and providing electric power to other components of second power converter 24', which are coupled directly or indirectly between positive and negative power buses 30' and 32'. Specifically, other components of second power converter 24' may include IGBTs 34a', 34b', 34c', 34d', and 34e', diodes 36a', 36b', 36c', and 36d', a resistor 38', and a capacitor 40'. IGBT 34e' and resistor 38' constitute an integrated braking chopper 41' configured to dissipate an extra power generated by motor 14 during, e.g., motor braking. The structure of second power converter 24' is similar to that of first power converter 24, and thus the details thereof are not repeated here.

Rectifier 28 includes a positive DC bus 42 coupled to positive power bus 30 of first power converter 24, a negative DC bus 44 coupled to negative power bus 32' of second power converter 24', and a voltage-dividing terminal 46 coupled to both negative power bus 32 of first power converter and positive power bus 30' of second power converter 24'. Positive DC bus 42, together with voltage-dividing terminal 46, applies the first DC output to first power converter 24. Similarly, negative DC bus 44, together with voltage-dividing terminal 46, applies the second DC output to second power converter 24'.

Rectifier 28 further includes a first voltage-dividing resistor 48 coupled between positive DC bus 42 and voltage-dividing terminal 46, a second voltage-dividing resistor 50 coupled between voltage-dividing terminal 46 and negative DC bus 44, a first smoothing capacitor 52 coupled between positive DC bus 42 and voltage-dividing terminal 46, and a second smoothing capacitor 54 coupled between voltage-dividing terminal 46 and negative DC bus 44. In other words, first voltage-dividing resistor 48 and first smoothing capacitor 52 are coupled to each other in a parallel connection, and second voltage-dividing resistor 50 and second smoothing capacitor 54 are coupled to each other in a parallel connection. First and second smoothing capacitors 52 and 54 are provided to smooth AC ripples associated with the rectification process and stabilize the output of rectifier 28. Capacitances and types of smoothing capacitors 52 and 54 may be properly selected to stabilize the voltage output at voltage-dividing terminal 46.

In some embodiments, resistances of first and second voltage-dividing resistors 48 and 50 may be approximately equal to each other, and thus the first and second DC outputs are approximately equal to each other. In this scenario, voltage-dividing terminal 46 may also be referred to as a "midpoint terminal," and the first and second DC outputs may each have a voltage value equaling to about a half of a peak voltage value of the AC input. Dividing equally between the first and second DC outputs helps to ensure uniformity among powers applied to different phases of motor 14. Nevertheless, in some embodiments, the resistances of first and second voltage-dividing resistors 48 and 50 may be different from each other, and thus the first and second DC outputs are also different from each other.

According to the disclosure, by properly applying the controlling signals to the gates of IGBTs 34a, 34b, 34c, and 34d, and the gates of IGBTs 34a', 34b', 34c', and 34d', a particular power scheme may be applied to different phases of motor 14. For example, a symmetrical control configuration may result in nearly identical currents flowing in each pair of magnetic poles of motor 14, thereby minimizing the voltage disturbance at the midpoint terminal. This arrangement may minimize or eliminate the need for additional voltage balancing components such as capacitors, resistors, or active chopper circuitry.

Consistent with embodiments of the disclosure, certain transistors may be utilized in addition to or in place of first and second voltage-dividing resistors 48 and 50. Using such transistors may help to achieve a more precise control of the voltage output at voltage-dividing terminal 46.

In the example shown in FIG. 1, the AC input is a three-phase AC input. Correspondingly, rectifier 28 shown in FIG. 1 includes three rectifying bridges 55a, 55b, and 55c configured to receive the three phases of the AC input via three input terminals 56, 58, and 60, respectively. First rectifying bridge 55a includes a first rectifying diode 62 and a second rectifying diode 64; second rectifying bridge 55b includes a third rectifying diode 66 and a fourth rectifying diode 68; and third rectifying bridge 55c includes a fifth rectifying diode 70 and a sixth rectifying diode 72. First, third, and fifth rectifying diodes 62, 66, and 70 each have a cathode coupled to positive DC bus 42 and an anode coupled to one of input terminals 56, 58, and 60. Second, fourth, and sixth rectifying diodes 64, 68, and 72 each have an anode coupled to negative DC bus 44 and a cathode coupled to one of input terminals 56, 58, and 60.

Consistent with embodiments of the disclosure, other types of devices may be employed in addition to or in place of first to sixth rectifying diodes 62, 64, 66, 68, 70, and 72, as long as such addition or replacement can achieve the required rectification operation. For example, silicon-controlled rectifiers may be used instead of rectifying diodes 62, 64, 66, 68, 70, and 72, such that variable control of the DC outputs from rectifier 28 can be realized. As another example, in a system in which an active regeneration of power back into the source of the AC input is required, first to sixth rectifying diodes 62, 64, 66, 68, 70, and 72 may be replaced with IGBTs enabling that active regeneration feature. With this configuration, rectifier 28 may be effectively replaced with an active power converter consisting of six IGBTs configured in a common single level inverter configuration or twelve IGBTs configured in a common tri-level configuration.

Rectifier 28 shown in FIG. 1 has three rectifying bridges 55a, 55b, and 55c. However, in some embodiments, motor system 10 may be utilized in an environment that has an AC power source other than a three-phase AC source, such as a two-phase AC source or a one-phase AC source. In such scenarios, rectifier 28 of motor system 10 may have different number of rectifying bridges than that shown in FIG. 1, depending on the number of phases in the AC power source.

Figure 3:
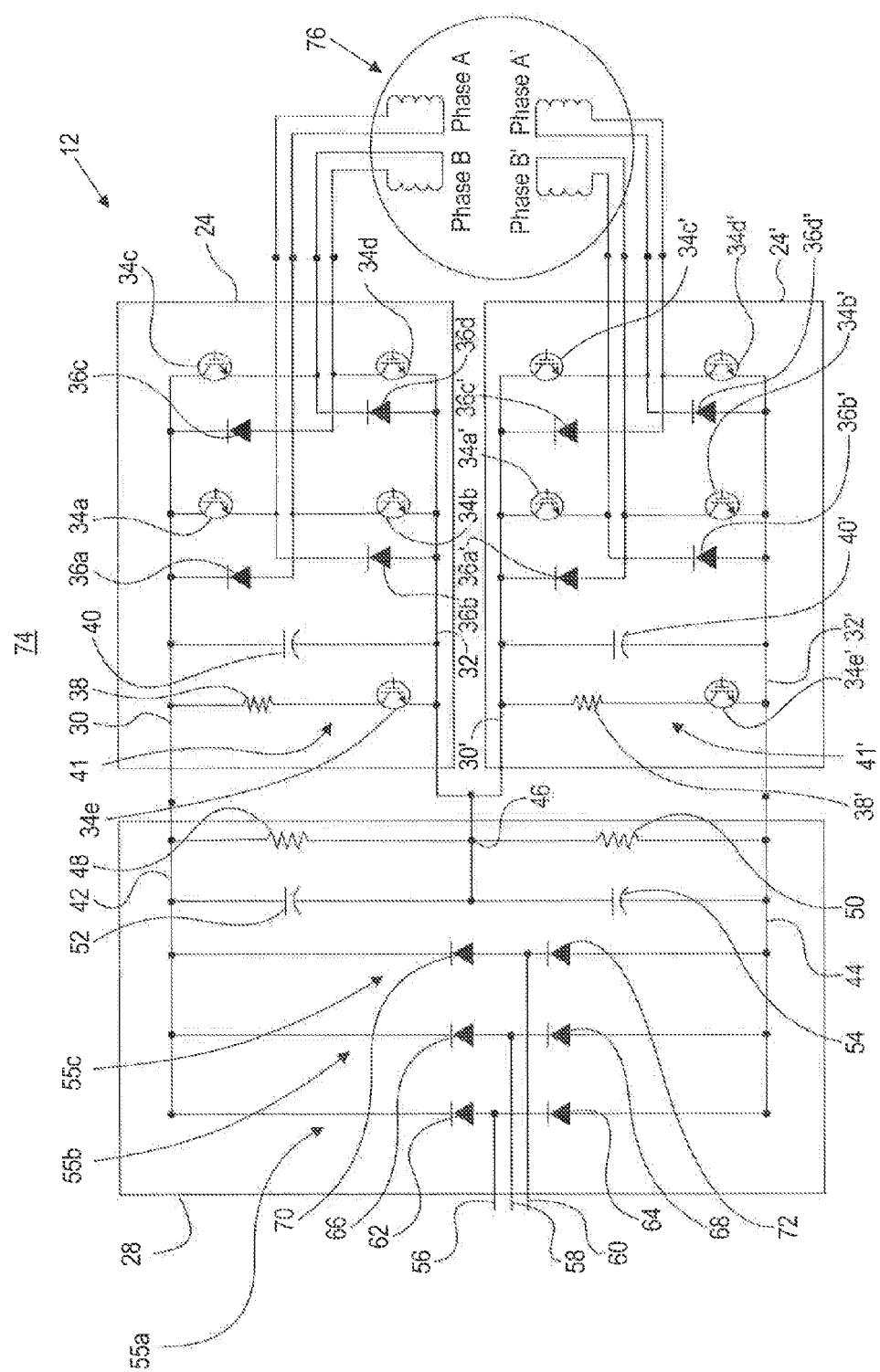
FIG. 3 is a circuit diagram illustrating another exemplary motor system.

FIG. 3 illustrates another exemplary motor system 74 having motor driver 12 and a motor 76. Motor system 74 is similar to motor system 10 shown in FIG. 1, except that in motor system 74, second power converter 24' is coupled to same phases of motor 76 as first power converter 24. For example, as shown in FIG. 3, first power converter 24 is coupled to Phase A and Phase B of motor 76, and second power converter 24' is also coupled to Phase A and Phase B of motor 76. In FIG. 3, the phases to which second power converter 24' is coupled are labeled as Phase A' and Phase B'. Phase A' and Phase B' refer to the same Phase A and Phase B to which first power converter 24 is coupled, but the prime is used to indicate that first and second power converters 24 and 24' may be coupled to different magnetic poles, i.e., different coils, of a same phase. Motor 76 shown in FIG. 3 may be the same as or different from motor 14 shown in FIG. 1.

INDUSTRIAL APPLICABILITY

The disclosed motor driver may be applicable to any machine that includes a motor, such as an underground cutting machine, and, in particular, a motor used in an environment having a high-voltage power supply and/or an environment in which an external disturbance may cause fluctuation in the motor's operation. The disclosed motor driver may reduce the number of high voltage rated devices that are needed in the circuit of the motor driver, and provide a smoother output power to the motor. The operation of the motor driver will now be explained.

Referring to FIG. 1, when motor system 10 is in operation, rectifier 28 of motor driver 12 receives the AC input at input terminals 56, 58, and 60. Due to their unidirectional conductivity, diodes 62, 64, 66, 68, 70, and 72 convert the AC input to a DC voltage applied across positive and negative DC buses 42 and 44. Such a DC voltage is divided by first and second voltage-dividing resistors 48 and 50, so as to generate the first DC output across positive DC bus 42 and voltage-dividing terminal 46, and the second DC output across voltage-dividing terminal 46 and negative DC bus 44. As such, a high-voltage AC input is converted and reduced to two relatively-low-voltage DC outputs. Therefore, voltage-dividing resistors 48 and 50, smoothing capacitors 52 and 54, and components in power converters 24 and 24' do not need to have the capability of sustaining the high voltage of the AC input. Instead, lower-voltage-rated devices can be used.

As disclosed above, the integrated braking chopper in each of first and second power converters 24 and 24' is configured to dissipate an extra power generated by motor 14. The extra power may be generated when motor 14 operates as a generator due to, for example, machine braking to slow the machine on grade, an external mechanical disturbance or other fault conditions, or when motor system 10 is being shut down, so that motor 14 feeds power back to motor driver 12 in a reverse direction. When this occurs, the integrated braking chopper in a corresponding one of first and second power converters 24 and 24' dissipates the extra power to, for example, prevent the corresponding power converter from over-voltage and/or to bleed down capacitor 40 or 40' when motor system 10 is being shut down.

In general, since there may always be a phase current flowing in more than one phase of motor 14 at any instant time, currents of different phases may overlap each other. Therefore, generally one or more phases of motor 14 coupled to first power converter 24 and one or more phases of motor 14 coupled to second power converter 24' may always have currents contemporaneously flowing therein. The voltages provided by first and second power converters 24 and 24' remain relatively balanced. For example, with a symmetric structure in which components of first power converter 24 are substantially identical to corresponding components of second power converter 24', and first voltage-dividing resistor 48 and second voltage-dividing resistor 50 are substantially identical to each other, first and second power converters 24 and 24' output substantially identical voltages to different phases of motor 14.

However, if for some reason one of first and second power converters 24 and 24' supplies more current than the other one, IGBT 34e or 34e' in the power converter that supplies the smaller current helps to balance the voltage output at voltage-dividing terminal 46, so as to balance the currents supplied by first and second power converters 24 and 24'. According to the disclosure, pairing of first and second power converters 24 and 24' with phases of motor 14 may be carefully selected so that current balance between first and second power converters 24 and 24' is optimized.

It is conceivable that techniques such as profiling of currents of different phases of motor 14, adjustment of turn-on and turn-off timings of motor phase control IGBTs, and activation and/or operation of braking chopper IGBTs can be individually employed or combined together to balance the voltage output at voltage-dividing terminal 46.

Further current balance may be achieved by motor system 74 shown in FIG. 3. In motor system 74, each phase of motor 76 is coupled to both first and second power converters 24 and 24'. As a consequence, first and second power converters 24 and 24' simultaneously deliver currents to each phase of motor 76. Compared to FIG. 1, the configuration shown in FIG. 3 may allow for a more even balance of loads between first and second power converters 24 and 24', and thus may achieve a better balance between currents supplied by first and second power converters 24 and 24'.

For example, assuming Phase B of motor 76 is on, i.e., supplied with current, and further assuming at an instantaneous time (such as within a couple of milliseconds), first power converter 24 is supplying more current than second power converter 24' due to a disturbance, then the voltage output at voltage-dividing terminal 46 tends to be driven to an unbalanced state. However, since Phase B is coupled to both first and second power converters 24 and 24', such an unbalance is shared by both first and second power converters 24 and 24', and thus it is easier and faster for the voltage output at voltage-dividing terminal 46 to be drawn back to the balanced state.

It will be apparent to those skilled in the art that various modifications and variations can be made to the motor driver of the disclosure. Other embodiments will be apparent to those skilled in the art from consideration of the specification and practice of the disclosed motor driver. It is intended that the specification and examples be considered as exemplary only, with a true scope being indicated by the following claims and their equivalents.

What is claimed is:

1. A motor driver, comprising:
   a first power bus;
   a first switching device coupled between the first power bus and a first terminal of a motor, wherein the first switching device includes a first insulated-gate bipolar transistor (IGBT) having a first gate configured to receive a first controlling signal, a first collector coupled to the first power bus, and a first emitter coupled to the first terminal of the motor;
   a second power bus;
   a second switching device coupled between the second power bus and a second terminal of the motor, wherein the second switching device includes a second IGBT having a second gate configured to receive a second controlling signal, a second collector coupled to the second terminal of the motor, and a second emitter coupled to the second power bus; and
   an integrated braking chopper coupled between the first and second power buses, the integrated braking chopper being configured to dissipate an extra power generated by the motor.

2. The motor driver according to claim 1, wherein the integrated braking chopper includes a resistor and an insulated-gate bipolar transistor (IGBT) coupled to each other in series.

3. The motor driver according to claim 2, wherein the IGBT includes:
   a collector coupled to the resistor;
   an emitter coupled to the second power bus; and
   a gate configured to receive a controlling signal.

4. The motor driver according to claim 1, further including:
   a first diode having a first cathode coupled to the first power bus and a first anode coupled to the second collector of the second IGBT; and
   a second diode having a second cathode coupled to the first emitter of the first IGBT and a second anode coupled to the second power bus.

5. The motor driver according to claim 1,
   wherein the first and second terminals of the motor are associated with a first phase of the motor,
   the motor driver further including:
   a third switching device coupled between the first power bus and a third terminal of the motor associated with a second phase of the motor; and
   a fourth switching device coupled between the second power bus and a fourth terminal of the motor associated with the second phase of the motor.

6. The motor driver according to claim 1,
   wherein:
   the integrated braking chopper is a first integrated braking chopper, and
   the first and second power buses, the first and second switching devices, and the first integrated braking chopper form a first power converter,
   the motor driver further including:
   a second power converter, including:
   a third power bus;
   a third switching device coupled between the third power bus and a third terminal of the motor;
   a fourth power bus;
   a fourth switching device coupled between the fourth power bus and a fourth terminal of the motor; and
   a second integrated braking chopper coupled between the third and fourth power buses, the second integrated braking chopper being configured to dissipate the extra power generated by the motor; and
   a rectifier configured to:
   generate a first DC output and a second DC output from an AC input, and
   apply the first DC output to the first power converter and the second DC output to the second power converter.

7. The motor driver according to claim 6, wherein the rectifier is configured to generate the first and second DC outputs each having a voltage value equaling to about a half of a peak voltage value of the AC input.

8. The motor driver according to claim 6, wherein the rectifier includes:
   a positive DC bus coupled to the first power bus;
   a negative DC bus coupled to the fourth power bus;
   a voltage-dividing terminal coupled to the second and third power buses;
   a first voltage-dividing resistor coupled between the positive DC bus and the voltage-dividing terminal; and
   a second voltage-dividing resistor coupled between the voltage-dividing terminal and the negative DC bus.

9. The motor driver according to claim 8, wherein resistances of the first and second voltage-dividing resistors approximately equal to each other.

10. The motor driver according to claim 8, wherein the rectifier further includes:
    a first smoothing capacitor coupled between the positive DC bus and the voltage-dividing terminal, and
    a second smoothing capacitor coupled between the voltage-dividing terminal and the negative DC bus.

11. The motor driver according to claim 6, wherein:
    the AC input includes a three-phase AC input, and
    the rectifier further includes:
    a first input terminal configured to receive a first phase of the AC input;
    a second input terminal configured to receive a second phase of the AC input;
    a third input terminal configured to receive a third phase of the AC input;
    a first rectifying bridge including:
    a first rectifying diode having a first anode coupled to the first input terminal and a first cathode coupled to the positive DC bus; and
    a second rectifying diode having a second anode coupled to the negative DC bus and a second cathode coupled to the first input terminal;
    a second rectifying bridge including:
    a third rectifying diode having a third anode coupled to the first input terminal and a third cathode coupled to the positive DC bus; and
    a fourth rectifying diode having a fourth anode coupled to the negative DC bus and a fourth cathode coupled to the first input terminal; and
    a third rectifying bridge including:
    a fifth rectifying diode having a fifth anode coupled to the first input terminal and a fifth cathode coupled to the positive DC bus; and
    a sixth rectifying diode having a sixth anode coupled to the negative DC bus and a sixth cathode coupled to the first input terminal.

12. A motor driver comprising:
    a first power converter configured to provide a first electric power to a motor, wherein the first power converter includes:
    a first power bus;
    a first switching device coupled between the first power bus and a first terminal of the motor;
    a second power bus; and
    a second switching device coupled between the second power bus and a second terminal of the motor;
    a second power converter configured to provide a second electric power to the motor, wherein the second power converter includes:
    a third power bus;
    a third switching device coupled between the third power bus and a third terminal of the motor;
    a fourth power bus; and
    a fourth switching device coupled between the fourth power bus and a fourth terminal of the motor; and
    a rectifier coupled to the first and second power converters, the rectifier is configured to:
    generate a DC voltage from an AC input,
    divide the DC voltage into at least a first DC output and a second DC output, and
    apply the first DC output to the first power converter and the second DC output to the second power converter.

13. The motor driver according to claim 12, wherein:
    the first power converter further includes:
    a first integrated braking chopper coupled between the first and second power buses, the first integrated braking chopper being configured to dissipate an extra power generated by the motor, and
    the second power converter further includes:
    a second integrated braking chopper coupled between the third and fourth power buses, the second integrated braking chopper being configured to dissipate the extra power generated by the motor.

14. The motor driver according to claim 12, wherein:
the rectifier includes:
a positive DC bus;
a negative DC bus;
a voltage-dividing terminal;
a first voltage-dividing resistor coupled between the positive DC bus and the voltage-dividing terminal; and
a second voltage-dividing resistor coupled between the voltage-dividing terminal and the negative DC bus, and
the motor driver is configured to provide the first DC output to the first power converter via the positive DC bus and the voltage-dividing terminal, and to provide the second DC output to the second power converter via the voltage-dividing terminal and the negative DC bus.

15. A motor system comprising:
a motor; and
a motor driver configured to drive the motor, the motor driver including:
a first power converter including:
a first power bus;
a first switching device coupled between the first power bus and the motor;
a second power bus;
a second switching device coupled between the second power bus and the motor; and
a first integrated braking chopper coupled between the first and second power buses, the first integrated braking chopper being configured to dissipate an extra power generated by the motor;
a second power converter including:
a third power bus;
a third switching device coupled between the third power bus and the motor;
a fourth power bus;
a fourth switching device coupled between the fourth power bus and the motor; and
a second integrated braking chopper coupled between the third and fourth power buses, the second integrated braking chopper being configured to dissipate the extra power generated by the motor; and
a rectifier coupled to the first and second power converters, configured to:
generate a first DC output and a second DC output from an AC input, and
apply the first DC output to the first power converter and the second DC output to the second power converter.

16. The motor system according to claim 15, wherein:
the motor includes a plurality of phases, each phase including at least one coil, and
the first, second, third, and fourth switching devices are coupled to a same one of the plurality of phases.

17. The motor system according to claim 15, wherein:
the motor includes a plurality of phases, each phase including at least one coil,
the first and second switching devices are coupled to a first one of the plurality of phases, and
the third and fourth switching devices are coupled to a second one of the plurality of phases different from the first one of the plurality of phases.

18. The motor system according to claim 15, wherein:
the first integrated braking chopper includes a first resistor and a first insulated-gate bipolar transistor (IGBT) coupled to each other in series, and
the second integrated braking chopper includes a second resistor and a second IGBT coupled to each other in series.

19. The motor system according to claim 15, wherein the rectifier is configured to generate the first and second DC outputs each having a voltage value equaling to about a half of a peak voltage value of the AC input.

20. The motor system according to claim 19, wherein the rectifier includes:
a positive DC bus coupled to the first power bus;
a negative DC bus coupled to the fourth power bus;
a voltage-dividing terminal coupled to the second and third power buses;
a first voltage-dividing resistor coupled between the positive DC bus and the voltage-dividing terminal; and
a second voltage-dividing resistor coupled between the voltage-dividing terminal and the negative DC bus.

21. The motor system according to claim 20, wherein resistances of the first and second voltage-dividing resistors approximately equal to each other.

* * * * *